(12) United States Patent
Kahlman

(10) Patent No.: US 8,139,452 B2
(45) Date of Patent: Mar. 20, 2012

(54) RECORD CARRIER COMPRISING AN ADDITIONAL SYNC-COLOR PATTERN AND METHOD AND DEVICE FOR USE WITH SUCH RECORD CARRIER

(75) Inventor: Josephus Arnoldus Henricus Maria Kahlman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 448 days.

(21) Appl. No.: 10/533,505

(22) PCT Filed: Nov. 4, 2003

(86) PCT No.: PCT/IB03/04909
§ 371 (c)(1),
(2), (4) Date: May 2, 2005

(87) PCT Pub. No.: WO2004/042720
PCT Pub. Date: May 21, 2004

(65) Prior Publication Data
US 2006/0004945 A1 Jan. 5, 2006

(30) Foreign Application Priority Data
Nov. 5, 2002 (EP) .................................. 02079642

(51) Int. Cl.
*G11B 20/22* (2006.01)
*G11B 7/24* (2006.01)

(52) U.S. Cl. ............... 369/47.24; 369/275.3; 369/59.25

(58) Field of Classification Search .............. 369/275.3, 369/59.24, 59.25, 47.24; 386/353; 714/769, 714/814; 711/100
See application file for complete search history.

(56) References Cited

U.S. PATENT DOCUMENTS

| | | | | |
|---|---|---|---|---|
| 5,854,592 | A * | 12/1998 | Kushita | 370/350 |
| 5,881,037 | A * | 3/1999 | Tanaka et al. | 369/59.24 |
| 6,300,886 | B1 * | 10/2001 | Hayami | 341/59 |
| 6,804,264 | B1 * | 10/2004 | Song | 370/500 |
| 7,065,030 | B2 * | 6/2006 | Tachino et al. | 369/59.25 |
| 2002/0093751 | A1 * | 7/2002 | Hayami | 360/39 |
| 2003/0103429 | A1 * | 6/2003 | Senshu | 369/47.24 |
| 2004/0109400 | A1 * | 6/2004 | Jung et al. | 369/59.25 |
| 2004/0165504 | A1 * | 8/2004 | Kobayashi | 369/53.36 |
| 2005/0002653 | A1 * | 1/2005 | Tachino et al. | 386/125 |

FOREIGN PATENT DOCUMENTS

| | | |
|---|---|---|
| CN | 1154756 A2 | 7/1997 |
| JP | 11-346154 | 12/1999 |
| JP | 2002093059 | 3/2002 |
| JP | 2002260341 | 9/2002 |
| JP | 2004103096 | 4/2004 |
| WO | 9631880 A1 | 10/1996 |
| WO | 9922375 A1 | 5/1999 |
| WO | WO9922375 A1 | 5/1999 |
| WO | 9963671 | 12/1999 |
| WO | WO9963671 A1 | 12/1999 |
| WO | 2004042720 A2 | 5/2004 |

* cited by examiner

Primary Examiner — Ali Neyzari

(57) ABSTRACT

The invention relates to a format for storing information on an optical recording medium. According to said format the record carrier comprises a synchronization pattern, which synchronization pattern comprises an identifying part consisting of a bit sequence chosen from 100 101, 010 101, 101 001, 010 100 or 100 100.

7 Claims, 3 Drawing Sheets

Figures 5, 6:
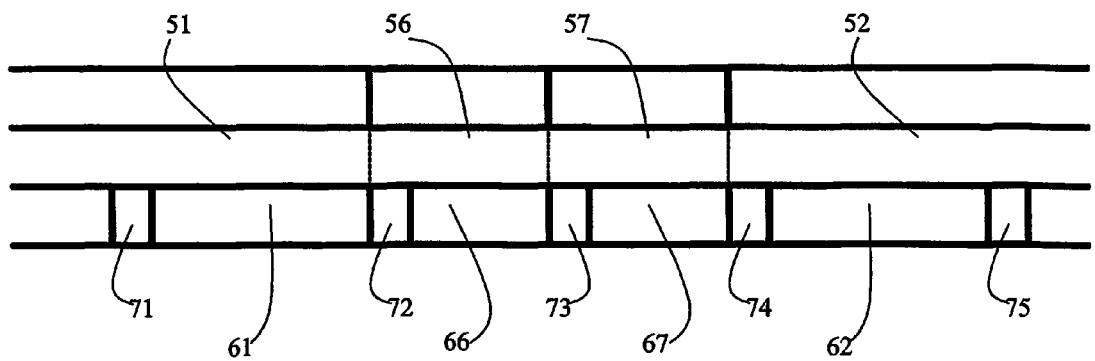

| Data bits | Modulation bits | |
|---|---|---|
| 00 00 00 00 | 010 100 100 100 | |
| 00 00 10 00 | 000 100 100 100 | |
| 00 00 00 | 010 100 000 | |
| 00 00 01 | 010 100 100 | |
| 00 00 10 | 000 100 000 | |
| 00 00 11 | 000 100 100 | |
| 00 01 | 000 100 | |
| 00 10 | 010 000 | |
| 00 11 | 010 100 | |
| 01 | 010 | |
| 10 | 001 | |
| 11 | 000 | If preceding modulation bits = xx1 |
| | 101 | If preceding modulation bits = xx1 |

| Data bit pattern to be substituted | Substituting modulation bits | Condition for substitution |
|---|---|---|
| 11 01 11 | 001 000 000 | If next modulation bits = 010 |

| Terminating data bits | Terminating modulation bits | |
|---|---|---|
| 00 00 | 010 100 | |
| 00 | 000 | |

Fig. 1

| Sync number | 24-bit sync body | 6-bit sync-colour pattern |
|---|---|---|
| FS0 | #01 010 000 000 010 000 000 010 | 000 001 |
| FS1 | #01 010 000 000 010 000 000 010 | 010 010 |
| FS2 | #01 010 000 000 010 000 000 010 | 101 000 |
| FS3 | #01 010 000 000 010 000 000 010 | 100 001 |
| FS4 | #01 010 000 000 010 000 000 010 | 000 100 |
| FS5 | #01 010 000 000 010 000 000 010 | 001 001 |
| FS6 | #01 010 000 000 010 000 000 010 | 010 000 |

Fig. 2

|  | Sync body | FS7 | data |
|---|---|---|---|
| Data bits |  |  | 01 11 01 11 |
| Modulation bits | #01 010 000 000 010 000 000 010 | 100 101 | 010 101 010 101 000 |

Fig. 3

|  | Sync body | FS7 | data |
|---|---|---|---|
| Data bits |  | 11 | 01 11 01 11 |
| Modulation bits | #01 010 000 000 010 000 000 010 | 100 101 | 010 101 010 101 000 |
| Substituted modulation bits |  |  | 000 000 |

Fig. 4

| Existing syc colours | | | Alternatives | | |
|---|---|---|---|---|---|
| FS0 | 000 001 | (F) | A | 101 001 | (FS2, I) |
| FS3 | 100 001 | (B, D) | B | 010 001 | (FS1, FS3, FS5, FS6) |
| FS5 | 001 001 | (B, C, E, K) | | | |
| | | | C | 001 000 | (FS4, FS5, FS6) |
| FS2 | 101 000 | (A, H) | | | |
| FS6 | 010 000 | (B, C) | D | 100 010 | (FS1, FS3, H) |
| | | | E | 001 010 | (FS1, FS5) |
| FS1 | 010 010 | (B, D, E, G) | F | 000 010 | (FS0, FS4) |
| | | | | | |
| FS4 | 000 100 | (C, F, K) | G | 010 100 | (FS1, H, I) |
| | | | H | 100 100 | (FS2, G, I) |
| | | | | | |
| | | | I | 100 101 | (A, H, J) |
| | | | J | 010 101 | (G, I) |
| | | | K | 000 101 | (FS5, FS4) |

RECORD CARRIER COMPRISING AN ADDITIONAL SYNC-COLOR PATTERN AND METHOD AND DEVICE FOR USE WITH SUCH RECORD CARRIER

The invention relates to a record carrier comprising synchronization patterns for identifying blocks of information, said synchronization patterns comprising a part for distinguishing one such synchronization pattern from another such synchronization pattern. The invention especially relates to a record carrier according to the Blu-ray Disc format. The invention further relates to a methods for recording information on said record carrier and for retrieving information from said record carrier, and to devices for recording information on said record carrier and for retrieving information from said record carrier.

In the current Blu-ray Disc format according to the Blu-ray Disc standard (Blu-ray Disc System Description, Rewritable Format, part 1, Basic Format Specifications) 7 synchronization patterns, FS0 to FS6, are defined, each synchronization patterns having its own sync-color pattern. In this context a sync-color pattern is meant to be a unique part of a synchronization pattern, which part distinguishes one such synchronization pattern from another such synchronization pattern. A sync-color pattern may be considered to be a signature identifying otherwise identical synchronization patterns.

Synchronization patterns are used, for example, to signify the start of an information block stored on the record carrier, such as a Recording Frame according to the Blu-ray Disc format. By applying a structure of distinguishable synchronization patterns it is possible to identify distinct information blocks.

According to the Blu-ray Disc standard a sync-color pattern consist of 6 information bits. These 6 bit sync-color patterns comply with the constraints of the 17PP modulation code (although the synchronization pattern themselves do not comply); an RLL-code with d=1 and k=7, and a Repeated Minimum Transition Runlength (RMTR) of 6. Moreover, for integrity reasons, these patterns are chosen such that their distance with relation to transition shifts (that is, their Hamming distance when only transition shifts occur) is greater than or equal to 2. The 17PP modulation code itself, and devices for recording and retrieving modulated data, is described in International Application WO 99/63671, while sync-color patterns are described in International Application WO 99/22375.

For certain applications it is advantageous to have at least an additional $8^{th}$ sync-color pattern. For example, synchronization patterns comprising such an additional sync-color could be required in an extension of the rewritable Blu-ray Disc standard to a ROM (Read Only Memory) version of this standard. These additional sync-color patterns would preferably also comply with the above mentioned constrains. However, providing such an additional sync-color pattern appears to be difficult.

It is an object of the present invention to provide a record carrier comprising such additional sync-color patterns, in addition to the existing 7 sync-color patterns, which comply as good as possible with the above-mentioned constraints.

This object is achieved according to a first aspect of the invention when the additional sync-color pattern is chosen to be a pattern consisting of either the 6 information bits 100 101 or of the 6 information bits 010 101. Such an additional sync-color pattern is, for example, referred to as FS7.

Although these sync-color patterns themselves comply with the modulation code constraints and Hamming distance constraints, they may under some conditions generate a RMTR violation when followed by specific source data bits. A worst-case scenario where a Repeated Minimum Transition Runlength (RMTR) of 7 occurs is shown in FIG. 3. Two embodiments of the invention overcoming such possible artifacts are described below.

According to a first embodiment of the invention the source data bits sequence 01 11 01 11 directly behind an additional sync-color pattern consisting of either the 6 information bits 100 101 or of the 6 information bits 010 101 is excluded. This will add a small constraint on the source data. However, such a constraint can easily be incorporated in the format, for example when the bits of the sync-color pattern are followed by bits representing an address. When, for example, the first bit following the sync-color pattern bits is fixed to a 1, the constraint is complied with.

According to a second embodiment of the invention the last nibble (that is, the last three bits) of the additional sync-color pattern consisting of either the 6 information bits 100 101 or of the 6 information bits 010 101 is treated as representing data bits 11 encoded to the three bits modulation word, which is according to the 17PP modulation code as is shown in the conversion table in FIG. 1. Subsequently the RMTR substitution according to the 17PP modulation coding rules is done on the data bits only. Now, the channel decoder can detect the additional sync-color pattern, and perform the inverse substitution unambiguously. An example of this is shown in FIG. 4.

The object of the invention is achieved according to a second aspect of the invention when the additional sync-color pattern is chosen to be a pattern consisting of either the 6 information bits 101 001, the 6 information bits 010 100, or of the 6 information bits 100 100. When the constraint of the Hamming distance being greater than or equal to 2 is released, several possible sync-color patterns become available.

In the table shown in FIG. 5 the existing sync-colors patterns FS0-FS6 are ordered in a systematic way in the left part of the table. The right part of the table shows alternative additional sync-colors patterns A-K. The neighboring sync-colors patterns having a transition shift distance of 1 are shown between brackets. Sync-color patterns 101 001 (A), 010 100 (G), and 100 100 (H) have a transition shift distance of 1 to only one existing sync-color pattern These patterns are therefore preferred as additional sync-color patterns. An further advantage of these patterns (A, G, H) is the lack of a possible RMTR violation.

These objects, features and advantages of the invention are described with reference to the accompanying drawings in which FIG. 1 shows the 17PP modulation code conversion table, FIG. 2 shows the synchronization patterns comprising the known sync-color patterns, FIG. 3 shows a worst-case scenario where a Repeated Minimum Transition Runlength of 7 occurs, FIG. 4 shows an example of an embodiment according to a first aspect of the invention, FIG. 5 shows a table with the existing sync-colors patterns and the alternative additional sync-colors patterns according to a second aspect of the invention, and FIG. 6 shows an example of a data bit stream comprising synchronization patterns, as stored on a record carrier.

FIG. 1 shows the 17PP modulation code conversion table. The data bits are converted to modulation bits according to this table. The modulation bit steam is stored on the record carrier, where a 1 in the modulation bit steam causes a transition in the signal stored on the record carrier. This modulation code is a Run Length Limited (RLL) code with d=1 and k=7, resulting in runlengths (that is, the number of consecutive 0's or 1's in the data bit stream encoded on the record carrier) ranging from a minimum runlength of 2 to a maximum runlength of 8. Moreover, this 17PP modulation code has the constraint that the Repeated Minimum Transition Runlength (RMTR) is equal to 6, causing the number of consecutive minimum runlengths to be limited to 6.

FIG. 2 shows seven known synchronization pattern. These synchronization patterns are numbered FS0 to FS6. Each synchronization pattern consists of a 24 bit sync body followed by a 6 bit sync-color pattern. The sync body is identical for all synchronization patterns, and signals the presence of a synchronization pattern. The sync-color pattern is a signature identifying a specific synchronization pattern. These specific synchronization patterns can be used to mark specific locations in a data bit stream, such as for example the start of an information block.

For integrity reasons (that is robustness against read errors, these sync-color patterns are chosen such that their distance with relation to transition shifts (that is, their Hamming distance when only transition shifts occur) is greater than or equal to 2. It is assumed that due to read errors only transition shift occur, and that no transitions are added or removed.

FIG. 6 shows a data bit stream as stored on a record carrier. The data bit stream comprises two information blocks 51, 52 that are linked by two link frames 56, 57. The information blocks consist of parts holding the information itself 61, 62 and of synchronization patterns 71, 74, 75. Such synchronization patterns may be chosen from the synchronization patterns FS0-FS6 shown in FIG. 2. It is preferred to have a specific synchronization pattern 74 reserved for indicating the start of an information block. Such a specific synchronization pattern 74 is, for example, synchronization pattern FS0 identified by its sync-color pattern 000 001. The other synchronization patterns 71, 75 (chosen from FS1-FS6) are used to mark specific locations within the information blocks. Two link frames 56, 57 link the two succeeding information blocks 51, 51. Each link frame consists of a synchronization pattern 72, 73 and a link frame body 66, 67. To distinguish the synchronization patterns 72, 73 in the link frames from the synchronization patterns 71, 74, 75 in the information blocks, these synchronization patterns 72, 73 in the link frames comprise an additional sync-color pattern according to the invention, such as for example a pattern consisting of the 6 information bits 100 101. The link frame bodies 66, 67 may consist of any data bits as long as the first 8 bits directly behind the additional sync-color pattern is not the data bits sequence 01 11 01 11, as this would cause a violation of the constraints. It is noted that, in an alternative embodiment, the synchronization pattern 73 in the second link frame 57 may be chosen from the synchronization patterns FS0-FS6 shown in FIG. 2, because the sequence of two link frames in the data bit stream is already signaled by the synchronization pattern 72 in the first link frame 56 comprising the distinguishing additional sync-color pattern.

The invention claimed is:

1. A record carrier comprising synchronization patterns for identifying blocks of information, said synchronization patterns comprising a part for distinguishing one such synchronization pattern from another such synchronization pattern, wherein the part for distinguishing the synchronization patterns consists only of the bit sequence 100 101 or of the bit sequence 010 101, and is directly followed by any 8 bit data bit sequence except the sequence 01 11 01 11.

2. Record carrier according to claim 1, characterized in that the synchronization pattern comprising a part for distinguishing the synchronization patterns consisting only of the bit sequence 100 101 or of the bit sequence 010 101, is directly followed by a bit sequence not violating the Repeated Minimum Transition Runlength constraint.

3. A record carrier comprising synchronization patterns for identifying blocks of information, said synchronization patterns comprising a part for distinguishing one such synchronization pattern from another such synchronization pattern, wherein the part for distinguishing the synchronization patterns consists only of the bit sequence 101 001, or the bit sequence 010 100, or the bit sequence 100 100, and is directly followed by any 8 bit data bit sequence except the sequence 01 11 01 11.

4. A device for recording synchronization patterns for identifying blocks of information onto a record carrier, said synchronization patterns comprising a part for distinguishing one such synchronization pattern from another such synchronization pattern, wherein the device is operative for recording synchronization patterns comprising a part for distinguishing the synchronization patterns which consists only of the bit sequence 100 101 or of the bit sequence 010 101, and is directly followed by any 8 bit data bit sequence except the sequence 01 11 01 11.

5. A device for recording synchronization patterns for identifying blocks of information onto a record carrier, said synchronization patterns comprising a part for distinguishing one such synchronization pattern from another such synchronization pattern, wherein the device is operative for recording synchronization patterns comprising a part for distinguishing the synchronization patterns which consists only of the bit sequence 101 001, or the bit sequence 010 100, or the bit sequence 100 100, and is directly followed by any 8 bit data bit sequence except the sequence 01 11 01 11.

6. A device for retrieving data patterns from a record carrier, said data patterns comprising synchronization patterns for identifying blocks of information, said synchronization patterns comprising a part for distinguishing one such synchronization pattern from another such synchronization pattern, wherein the device is operative for identifying a synchronization pattern comprising a part for distinguishing the synchronization patterns which consists only of the bit sequence 100 101 or of the bit sequence 010 101, and is directly followed by any 8 bit data bit sequence except the sequence 01 11 01 11.

7. A device for retrieving data patterns from a record carrier, said data patterns comprising synchronization patterns for identifying blocks of information, said synchronization patterns comprising a part for distinguishing one such synchronization pattern from another such synchronization pattern, wherein the device is operative for identifying a synchronization pattern comprising a part for distinguishing the synchronization patterns which consists only of the bit sequence 101 001, or the bit sequence 010 100, or the bit sequence 100 100, and is directly followed by any 8 bit data bit sequence except the sequence 01 11 01 11.

* * * * *